US011340442B2

(12) United States Patent
Berretta et al.

(10) Patent No.: US 11,340,442 B2
(45) Date of Patent: *May 24, 2022

(54) APPARATUSES, SYSTEMS AND METHODS FOR GENERATING COLOR VIDEO WITH A MONOCHROME SENSOR

(71) Applicant: Life Technologies Corporation, Carlsbad, CA (US)

(72) Inventors: Marc Berretta, Los Angeles, CA (US); Jason Mecham, Snohomish, WA (US); Frank Metting, Bothell, WA (US); Jonathan Paullin, Kirkland, WA (US); Paul Boeschoten, Redmond, WA (US); Erik Persmark, Eugene, OR (US); Eric Altendorf, Everett, WA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,221

(22) Filed: Sep. 30, 2020

(65) Prior Publication Data

US 2021/0011273 A1 Jan. 14, 2021

Related U.S. Application Data

(62) Division of application No. 16/381,438, filed on Apr. 11, 2019, now Pat. No. 10,831,015.

(Continued)

(51) Int. Cl.
*G02B 21/36* (2006.01)
*G02B 21/00* (2006.01)
(Continued)

(52) U.S. Cl.
CPC ....... *G02B 21/367* (2013.01); *G02B 21/0076* (2013.01); *G02B 21/06* (2013.01);
(Continued)

(58) Field of Classification Search
CPC .. G02B 21/367; G02B 21/0076; G02B 21/06; G02B 21/365; G02B 21/086;
(Continued)

(56) References Cited

U.S. PATENT DOCUMENTS 5,332,968 A * 7/1994 Brown ................... G01R 33/56
324/309
6,208,749 B1 * 3/2001 Gutkowicz-Krusin ......................
A61B 5/442
382/128

(Continued)

OTHER PUBLICATIONS

Anonymous, "B-Series Bright-Field Microscope Illuminators", Oct. 26, 2015, XP055597347, Retrieved from the internet: <https://www.biovis.com/images/light_scopeled/Datasheet_B-Series_20151026.pdf> retrieved on Jun. 18, 2019, pp. 1-2.

(Continued)

*Primary Examiner* — John R Schnurr
(74) *Attorney, Agent, or Firm* — Workman Nydegger

(57) ABSTRACT

Apparatuses, systems and methods for generating color video with a monochrome sensor include the acts of (i) selectively energizing each of a plurality of light sources in a sequence, (ii) capturing a monochrome image of the illuminated sample at a monochrome sensor at each stage of the sequence, and (iii) generating a color video from the monochrome images. The sequence can have a series of stages with each stage of the sequence corresponding to activation of a different wavelength of light from the light sources to illuminate a sample. Generating the monochrome video can include the acts of compiling a plurality of monochrome images captured at the monochrome sensor with a single light source into a series of monochrome video frames comprising the monochrome video.

19 Claims, 5 Drawing Sheets

Related U.S. Application Data

(60) Provisional application No. 62/701,419, filed on Jul. 20, 2018, provisional application No. 62/656,720, filed on Apr. 12, 2018.

(51) Int. Cl.
  *G02B 21/06* (2006.01)
  *H04N 5/225* (2006.01)
  *H04N 5/232* (2006.01)
  *H04N 9/73* (2006.01)
  *H04N 9/76* (2006.01)

(52) U.S. Cl.
  CPC ....... *H04N 5/2256* (2013.01); *H04N 5/23245* (2013.01); *H04N 9/735* (2013.01); *H04N 9/76* (2013.01)

(58) Field of Classification Search
  CPC .. H04N 5/2256; H04N 5/23245; H04N 9/735; H04N 9/76
  See application file for complete search history.

(56) References Cited

U.S. PATENT DOCUMENTS

| | | |
|---|---|---|
| 2005/0190955 A1* | 9/2005 | Brown ................ G01R 33/56 382/128 |
| 2009/0079825 A1 | 3/2009 | Calnegru |
| 2009/0295963 A1 | 12/2009 | Bamford et al. |
| 2012/0013726 A1 | 1/2012 | Thorburn |
| 2012/0182411 A1 | 7/2012 | Nakatsuka et al. |
| 2014/0267672 A1 | 9/2014 | Morrison et al. |
| 2018/0164567 A1 | 6/2018 | Chan |
| 2018/0247106 A1 | 8/2018 | Javidi et al. |

OTHER PUBLICATIONS

Anonymous, "Data Sheet: PCO.edge 5.5", Aug. 20, 2013, XP055597339, Retrieved from the Internet: <https://www.pco.de/fileadmin/user_upload/db/download/BR_pco_edge55_102.pdf> retrieved on Jun. 18, 2018, pp. 1,7.

* cited by examiner

APPARATUSES, SYSTEMS AND METHODS FOR GENERATING COLOR VIDEO WITH A MONOCHROME SENSOR

CROSS-REFERENCE TO RELATED APPLICATIONS

This application claims the benefit of priority to U.S. Provisional Application No. 62/701,419, filed Jul. 20, 2018, and to U.S. Provisional Application No. 62/656,720, filed Apr. 12, 2018, which disclosures are herein incorporated by reference in their entirety.

BACKGROUND

Technical Field

The present application relates to microscopy apparatuses, systems and methods for generating videos. More particularly, the present application relates to apparatuses, systems and methods for generating color videos from a sequence of images captured with a monochrome sensor.

Introduction

Microscopy is concerned with observing small, often microscopic, objects. Traditional microscopes incorporate a system of lenses to magnify, and thereby allow viewing of, such small objects. In an optical microscope, the system of lenses directs a magnified image of the small object to an eyepiece of the microscope while in a digital microscope, the image is focused on a camera or other image sensor. The camera records or relays image information, which can be rendered for display at a monitor or stored for later viewing. Such traditional microscopes are frequently large and expensive, and owing to the precision required to view microscopic objects, particularly with high resolution, the optics within most lens-based microscopes are delicate.

The cost and complexity of microscopes can be exacerbated as the microscope is outfitted to enable different types of imaging methods. For example, fluorescent microscopy is commonly used in research and clinical settings and can advantageously be used to identify the presence, absence, quantity, function, and localization of specific markers, structures, processes, or organelles within a cell or tissue sample. Microscopes enabled for fluorescence microscopy require a fluorophore excitation source, typically a laser, which adds to the complexity and cost of the microscope. Microscopes configured for fluorescence microscopy often use monochrome cameras to capture fluorescence images as monochrome cameras tend to provide a better contrast and a higher resolution than color cameras with a similar number of pixels and are often less expensive.

On the other hand, color cameras are useful for capturing color image data, which monochrome cameras are thus far incapable of doing. Color imaging data (e.g., images and video) are normally acquired using a white light source and color camera. In particular, white light is channeled evenly through a sample to a color camera which provides either raw image data or color image data to a display. White light emitting diodes (LEDs) are often used as light sources along with diffusers to provide an evenly lit sample. Mirrors are also often used to reflect the sample's image to the color camera's lens.

Image data captured by the color camera can be processed into a color image on the camera and transmitted, or it may be transmitted as raw data which is then processed into a color image by image processing software. Microscopes which collect both types of image data (i.e., both monochrome and color image data) normally require both a monochrome and color camera. These microscopes are mechanically more complex, and the associated processes for controlling image capture are also more complex due to the need to control microscope configurations for each type of acquisition (e.g., controlling the movement of monochrome and color cameras into the sample light path, differential image data processing steps, etc.) Furthermore, many color cameras arrange pixels in a Bayer pattern or apply a Bayer mask to differentially receive and interpret red, green, and blue component light signals. This can reduce the overall camera sensitivity, particularly within the red channel, and may also produce unsatisfactory hues within resultant images.

The bulk, complexity, and expense of current microscope systems limit their utility. Accordingly, there is a need for microscope systems that are mechanically simpler and which provide opportunities for expanded use, among a number of additional problems and disadvantages in the field of image acquisition and processing that can be addressed.

BRIEF SUMMARY

Various embodiments disclosed herein are related to apparatuses, methods, and systems for generating color video with a monochrome camera. Such embodiments beneficially improve microscopy systems by, for example, simplifying the microscopy system, reducing the number of components and the overall size of microscopy systems, and reducing the cost of microscopy systems while maintaining essentially the same functionality.

A first aspect provides for a method for generating color video with a monochrome camera. The method includes selectively energizing each of a plurality of light sources in a sequence. The sequence has a series of stages with each stage of the sequence corresponding to activation of a different wavelength of light from one or more light sources to illuminate a sample. The method additionally includes the act of capturing a monochrome image of the illuminated sample at a monochrome camera at each stage of the sequence, and generating a color video from the monochrome images.

The disclosed methods for generating a color video with a monochrome camera can additionally include the act of assigning a color to the monochrome images based on the corresponding different wavelength of light at each stage of the sequence and compiling a sequence of video frames with each video frame including a composite color image. The composite color image includes a first monochrome image captured at a first stage of the sequence with a first wavelength of light, a second monochrome image captured at a second stage of the sequence with a second wavelength of light, and a third monochrome image captured at a third stage of the sequence with a third wavelength of light. Some methods may include the step of color balancing the color video by automatically or manually adjusting an intensity of the light sources, which in some instances, include the primary colors of light—a red light, a green light, and a blue light.

In an exemplary aspect, generating a color video includes compiling a first video frame and a second video frame. The composite color image of the first video frame includes a first monochrome image associated with a first wavelength of light in a first cycle of the sequence, a second monochrome image associated with a second wavelength of light in the first cycle of the sequence, and a third monochrome image associated with a third wavelength of light in the first cycle of the sequence. The second video frame, which is chronologically after the first video frame, is a composite color image that includes the second monochrome image, the third monochrome image, and a fourth monochrome image associated with a first wavelength of light in a second cycle of the sequence.

In some embodiments, methods for generating a color video with a monochrome camera can additionally include selectively generating a monochrome video of the sample (e.g., in response to a request). Generating the monochrome video can include compiling a plurality of monochrome images captured at the monochrome camera with a single light source into a series of monochrome video frames. The series of monochrome video frames comprises the monochrome video.

The methods disclosed herein additionally enable the selection and viewing of monochrome images from the color/monochrome video.

Another aspect provides an imaging apparatus or system for generating color video. The apparatus or system can include a light assembly having a plurality of light sources arranged about an optical axis of the light assembly. The light assembly can be configured to selectively energize the plurality of light sources in a sequence. The plurality of light sources can include, in an exemplary instance, a white light source, a red light source, a green light source, and a blue light source. The apparatus or system can additionally include a stage assembly configured to receive a biological sample within a light path of the light assembly, a monochrome camera disposed within the light path and configured to generate monochrome images corresponding to successive stages of the sequence, and an image processor in electrical communication with the monochrome camera. The image processor can be configured to receive the monochrome images at successive time points and compile the monochrome images into a plurality of video frames to generate a color video.

The disclosed imaging apparatuses or systems can additionally include a microscope objective aligned with the optical axis and a lens tube aligned with the optical axis. The imaging apparatus or system can additionally include a light barrel aligned with the optical axis and positioned so as to encircle the light assembly, the light barrel having a light diffuser positioned therein. The light barrel can additionally include a second light diffuser spaced apart from the light diffuser by a distance and a third light diffuser positioned adjacent the second light diffuser and spaced apart from the light diffuser by a second distance.

The disclosed imaging apparatuses or systems or components thereof can be incorporated into an apparatus or system for generating color video from monochrome images that includes one or more processors and one or more computer readable media having stored thereon computer-executable instructions that are executable by the one or more processors to cause the system to perform one or more method acts of the methods disclosed herein.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1:
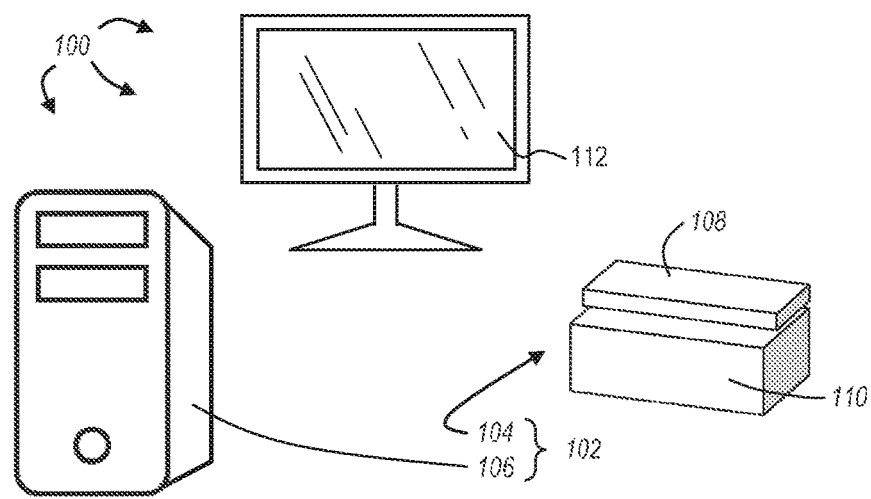
FIG. 1 illustrates an example embodiment of a system incorporating features disclosed or envisioned herein.

As used in the specification, a word appearing in the singular encompasses its plural counterpart, and a word appearing in the plural encompasses its singular counterpart, unless implicitly or explicitly understood or stated otherwise. Furthermore, it is understood that for any, given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities, constituents, distances, or other measurements used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Furthermore, as used in the specification and appended claims, directional terms, such as "top," "bottom," "left," "right," "up", "down," "upper," "lower," "proximal," "adjacent," "distal," and the like are used herein solely to indicate relative directions and are not otherwise intended to limit the scope of the specification or claims.

Overview of Imaging Systems and Methods

Microscopes are tremendously useful tools that can be used to view and image small, often microscopic objects. However, the precise nature of microscopy requires a complex and expensive set of instruments. This is further complicated by the varying number and types of microscopy methods available, each of which require additional component. For example, a simple optical microscope can be modified with a camera that toggles the viewing area between an eyepiece and the camera lens to enable photographs or videos to be taken of a sample. In more complex methodologies such as fluorescence confocal microscopy, a digital microscope can be modified with lasers for exciting fluorophores present in a sample and with an automated motor for advancing the sample through a series of micrometer-thin z-sections. A digital camera (or other image sensor associated therewith) associated with the microscope synchronously captures image data at each of the z-sections. The image data is then processed by a computing system to create a three dimensional model of the sample. As used herein, a camera refers to any applicable image sensor compatible with the apparatuses, systems and methods described herein, including but not limited to charge-coupled devices, complementary metal-oxide-semiconductor devices, N-type metal-oxide-semiconductor devices, Quanta Image Sensors, combinations of the foregoing such as scientific complementary metal-oxide-semiconductor devices, and the like.

Designing a microscope to perform many of the commonplace microscopy methods can be cost prohibitive. Not only does each additional, specialized component require additional time and resources to obtain and successfully implement within an existing microscope, each additional component added onto the microscope increases the mechanical and operational complexity of the microscope. This increases the likelihood of a mechanical failure and can potentially make the microscope more difficult to use. Furthermore, many microscope components are operated by computer-executable instructions (e.g., a software application), and incompatibilities between various software applications can limit the combined use of retrofitted components or make them less efficient.

Most microscopes are configured to capture image data of a sample. For practical and economic reasons, many of these microscopes are coupled only (or primarily) to a monochrome camera not to a color camera. Monochrome cameras enable capture of high resolution image data that can be used in a wide range of microscopy methods, but when color image data is desired or required, either the monochrome camera has to be substituted with a color camera or the user has to find a microscope specially equipped for capturing color image data. In either case, additional resources and time are required.

To overcome the limitations of prior art microscope systems, the systems and methods disclosed herein simplify microscopes by enabling acquisition of color image data from a monochrome camera. An exemplary method successively captures images of a sample illuminated in each of the primary light spectra (i.e., the red, green, and blue (RGB) wavelengths) and compiles the images into a single image, thereby generating a color image of the sample using a monochrome camera. Importantly, the resultant color image is not a false-colored image obtained through image processing techniques; rather, each pixel of the compiled color image includes RGB intensity values (respectively obtained from the red, green, and blue monochrome images) as if the image was captured using a white light source. Further, by selectively energizing different light sources in a sequence and synchronizing image capture at a high frame rate, the image data captured by the monochrome camera can be used to generate a color video, including a real-time color video. For example, a first color video frame can be a compilation of the most recently captured RGB monochrome images. Upon capturing a newer (i.e., a more recent) red, green, or blue monochrome image, a second color video frame can be compiled that replaces the outdated monochrome image with the newer monochrome image. This process continues as newer RGB monochrome images are captured, and concatenating the color video frames generated in this manner results in a color video.

Applications of this technology can be used to improve current microscope systems by allowing microscopes already outfitted with a monochrome camera to be modified, with the appropriate hardware and/or software changes, to acquire the ability to generate color image data, particularly color video, without the use of a color camera. By removing the need for a color camera while still enabling the generation of color image data, disclosed systems and methods reduce the cost and mechanical and operational complexities of microscope systems while expanding their utility—or at the very least not diminishing their functionality. Such a reduction in complexity can advantageously reduce the footprint of microscopes and reduce the likelihood of mechanical failures (e.g., less moving parts and less handling of microscope components results in less wear and a lower incidence of accidental damage), which can extend the lifetime use of microscopes and can do so at a lower operational cost.

Additionally, by utilizing a monochrome camera to generate color image data, microscopes become a more versatile and efficient tool. For example, such a microscope can switch from generating a color video to generating a monochrome video without necessitating a switch between different cameras or requiring an optical filter. Similarly, such a microscope can switch from generating a monochrome video to generating a color video without necessitating a physical switch between different cameras. This saves time and energy and allows for a more dynamic and responsive microscope.

Clearly, the systems and methods disclosed herein offer significant advantages over prior art microscopy systems and methods. Color cameras typically include an array of pixels that individually acquire one of the three component primary colors. This can be accomplished by evenly distributing component-specific pixels throughout the array, organizing the component-specific pixels in a pattern, or by overlaying a mosaic filter (e.g., a Bayer filter) to ensure each pixel receives only single □ color intensity information at given pixel locations. In each instance, the resolution with respect to each component primary color is less than the resolution of the entire array. Because each pixel of a monochrome camera records light information, a monochrome image will have a higher single-color resolution than a color image captured using a color camera that has the same number of pixels.

Also, because the color image data generated by the disclosed systems and methods is a compilation of monochrome components captured using a monochrome camera, each color image or color video frame can be a higher resolution image/video frame than that which would result from using a color camera that has a similar number of pixels as the monochrome camera. This increases the clarity and granularity of data that can be extracted from the image data over prior art microscopy systems and methods (e.g., high resolution single component images can be dissected from compiled image data) and additionally allows higher resolution color image data to be generated using a lower total pixel count camera—what has traditionally been a less expensive camera. Further, the unique coordination of light source illumination, image acquisition, and image processing described herein allows for the generation of color image data to take place at high frame rates, making a color video, including a real-time or near-real-time color video, representation of the sample possible.

Aspects of the disclosed systems and methods include image processing. Accordingly, embodiments disclosed or envisioned herein may comprise or utilize a special purpose or general-purpose computer including computer hardware, such as, for example, one or more processors, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., an "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, tablets, smart phones, routers, switches, and the like. Embodiments may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud."

In this specification and in the following claims, a computer system is also defined to include imaging systems (e.g., imaging system 102 in FIG. 1). Disclosed imaging systems can include special-purpose computers configured to capture a series of monochrome images and compile the images into a video. The video is preferably a color video generated from a stream of monochrome images, but the imaging system can additionally be configured to generate a monochrome video from the same or a different stream of monochrome images.

FIG. 1 illustrates an exemplary system 100 incorporating features disclosed or envisioned herein. At the heart of the system 100 is an imaging system 102 in which samples, such as biological cells, are imaged and analyzed. The exemplary imaging system 102 includes, but is not limited to, an imaging device 104 and a computing device 106. The imaging device 104 includes a stage assembly 108 mounted within a microscope assembly 110. The stage assembly 108 is configured to house the components required to position a sample (such as, e.g., a 96-well plate or a slide containing cells) so the microscope assembly 110 can image the cells. Within the imaging device 104 is a monochrome camera (e.g., monochrome camera 114 of FIG. 2) configured to capture monochrome image data. In some embodiments, the monochrome camera is similarly positioned within the light path generated by the imaging device 104 and captures light transmitted through the sample.

In a general working example, components of the imaging system 102 are configured to communicate with the light assembly 116 and/or the monochrome camera 114 to control or coordinate the selective and cyclic energizing of light sources and corresponding capture of image data. For example, a computing device 106 can be in electrical communication with the light assembly 116 to control or direct any of when and which of a plurality of light sources are selectively energized, at what intensity, and for how long. The computing device 106 can additionally be in electrical communication with the monochrome camera 114 to instantiate or modify an image capture frequency or timing. The captured image data is further processed, as described below, to generate a color image and/or color video. In a preferred embodiment, the imaging system 102 synchronizes sample illumination and image acquisition using the monochrome camera 114—at a high frame rate to generate a color video, including a real-time or near-real-time color video, of the sample.

As used herein, the term "video" or the like is intended to include the display of images at a frame rate equal to, or faster than, 6 frames per second. The frame rates for a video can include the display of images at 6, 7, 8, 9, 10, 12, 14, 16, 18, 20, 24, 30, 48, 50 or 60 frames per second, as well as all other rates in-between 6 and 60 frames per second and frame rates higher than 60 frames per second.

As used herein, the term "real-time color video" or the like is intended to include the nearly simultaneous acquisition, processing, and storage/display of a video representing the sample without any noticeable time lag or visual loss of image data. The term "near-real-time color video" or the like, as used herein, includes the acquisition, processing, and storage/display of a video representing a sample that includes a time lag or visual loss of image data. The time lag for a near-real-time video, as used herein, is less than 2-5 seconds, preferably less than 1 second, and more preferably, less than 0.5 seconds. The visual loss of data for a near-real-time video can include visual artifacts, such as color banding artifacts, a lack of color balancing, or similar, and in some embodiments, visual loss of data can be mitigated using image processing techniques described herein.

It should be appreciated that the computing device 106 can additionally be in electrical communication with other components of the imaging system 102, such as the microscope assembly 110 (e.g., to change objective magnification) and/or the stage assembly 108 (e.g., positioning and focusing a sample prior to, during, and/or after imaging).

With continued reference to FIG. 1, the stage assembly 108 can be mounted on or otherwise be associated with the imaging device 104 and can include a positioning mechanism configured to retain and selectively move a sample for viewing by the imaging device 104, as known in the art. As it should be appreciated, the stage assembly 108 can be configured to move within any of three-dimensions, as known in the art. For example, the stage assembly 108 can be configured to move laterally (e.g., in an x, y-plane transverse to a light path generated by the imaging device 104) to position different portions of the sample within the light path. The stage assembly 108 can additionally, or alternatively, be configured to move in a z-direction (e.g., between parallel x,y-planes that are each disposed at different distances from along the light path) using any mechanism known in the art, such as, for example, a stepper motor and screw/nut combination providing step-wise movements of the sample toward/away from a camera in increments down to 0.006 μm/microstep. It should be appreciated that the computing device 106 can additionally be in electrical communication with other components of the imaging system 102, such as the stage assembly 108 (e.g., positioning and focusing a sample prior to, during, and/or after imaging) and/or the microscope assembly 110 (e.g., to change objective magnification).

Upon capturing image data at the camera, the data can be analyzed and/or stored locally at the imaging device 104 and/or in conjunction with the computing device 106. This can include, for example, compiling monochrome images into a composite color image/color video frame and/or generating a (color or monochromatic) video from the monochrome images. The computing device 106 can additionally be used as a controller for the system as well as for performing, by itself or in conjunction with imaging device 104, the analysis and/or storage of data obtained by imaging device 104. Computing device 106 can comprise a general purpose or specialized computer or server or the like, as defined above, or any other computerized device. Computing device 106 can communicate with imaging device 104 directly or through a network, as is known in the art. In some embodiments, computing device 106 is incorporated into the imaging device 104. In some embodiments, the computing device 106 is electronically coupled to the camera and light sources of the imaging device 104 to synchronize selectively energizing light sources with image acquisition.

System 100 can also include a user display device 112 to display results and/or system configurations. Imaging device 104 and/or computing device 106 can communicate, either directly or indirectly, with user display device 112 and can cause the monochrome and/or color image data to be displayed on the user display device 112. For example, the computing device 106 can generate a color video from monochrome images and display the color video on the display device. As should be appreciated, the generated video can be displayed as a real-time video or near-real-time video as it is generated by the computing device 106 or from a stored video file generated prior to being displayed.

In one embodiment, one or more of the method steps described herein are performed as a software application. However, embodiments are not limited to this and method steps can also be performed in firmware, hardware or a combination of firmware, hardware and/or software. Furthermore, the steps of the methods can exist wholly or in part on the imaging device 104, computing device 106, and/or other computing devices.

An operating environment for the devices of the system may comprise or utilize a processing system having one or more microprocessors and system memory. In accordance with the practices of persons skilled in the art of computer programming, embodiments are described below with reference to acts and symbolic representations of operations or instructions that are performed by the processing system, unless indicated otherwise. Such acts and operations or instructions are referred to as being "computer-executed," "CPU-executed," or "processor-executed."

Exemplary Microscope Assemblies

Figure 2:
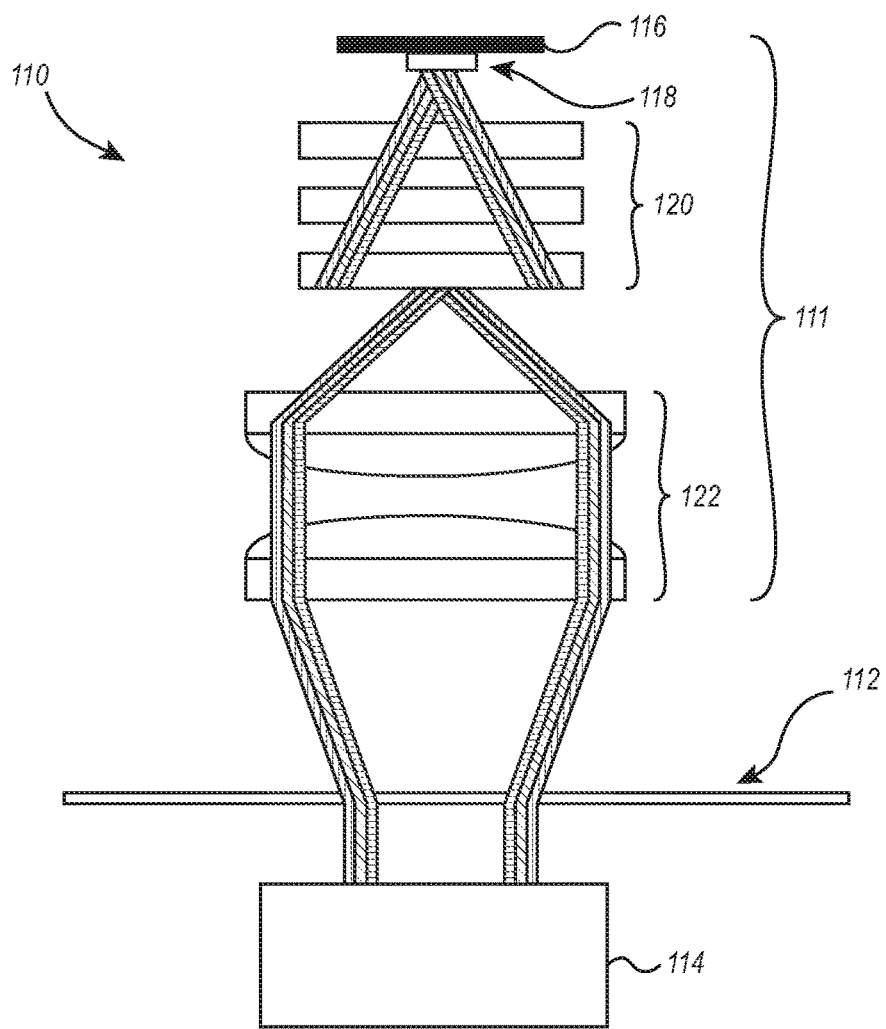
FIG. 2 illustrates a simplified schematic of lighting condenser and a camera with a sample disposed between the lighting condenser and the camera.

As described above, the imaging system 102 can include a microscope assembly 110 as part of the imaging device 104. Illustrated in FIG. 2 is a simplified schematic of a portion of an exemplary microscope assembly 110, namely lighting condenser 111. In simplified form, the lighting condenser 111 includes a light assembly 116, which is configured to selectively energize one or more light sources 118 to produce different wavelengths of light (e.g., red, green, and blue wavelengths illustrated in FIG. 2 as differentially hatched lines emanating from the light source 118), and one or more light diffusers 120 and one or more condenser lenses 122 to uniformly, diffuse and focus the emitted wavelengths of light on a sample 109. As shown in FIG. 2, light generated by the one or more light sources 118 is directed through one or more light diffusers 120 and one or more condenser lenses 122 of the lighting condenser 111 where it is focused on the sample 109. A monochrome camera 114 positioned in the light path created by the lighting condenser 111 captures light transmitted through the sample 109. Resulting monochrome images are compiled into color video frames that comprise a color video.

While the simplified illustration of a lighting condenser 111 in FIG. 2 depicts three evenly spaced light diffusers 120 and a pair of condenser lenses 122, it should be appreciated that lighting condensers used within disclosed systems and methods for generating color videos using a monochrome camera can include any number and/or type of light diffusers 120 and condenser lenses 122. The lighting condenser can be configured based on the particular microscope or microscopy methodology, the wavelengths of light emitted by the light source 118, a desired outcome (e.g., uniform lighting of the sample), or for any other reason.

The number and positioning of light diffusers 120 and condenser lenses 122 within the lighting condenser 111 can affect, among other things, the uniformity of light illuminating the sample and can impact the resolution of monochrome images, individually, and the resolution and color balancing of a composite image, generally. Because monochrome images of differing wavelengths of light are compiled as the component channels of a color image, nonuniform illuminating light can cause color balancing issues within the resulting composite image. For example, nonuniform illumination of the sample using a first wavelength of light (e.g., one of the primary colors of light, such as a red light) can result in a blotchy or graded monochrome image that misrepresents the actual intensity and distribution of color within the sample. This issue can be compounded if there is nonuniform illumination of the sample with a second and/or third wavelength of light (e.g., the remaining primary colors of light a green and/or blue light when the first wavelength of light is a red light), particularly if the nonuniform illumination of the second and/or third wavelength results in a different pattern of focused or graded light intensity than that generated by the first wavelength of light. In such a case, the resulting monochrome image from the second/third wavelength of light would fail to match the type of nonuniform illumination present in the monochrome image generated from the first wavelength of light, and when compiled, the intensity information informing each of the component channels of the color image would cause a skewed and discolored image compared to the actual coloring of the sample.

Accordingly, in some embodiments, the number and type of light diffusers 120 and condenser lenses 122, in addition to the spacing of each from the light source, sample, camera, and/or from each other, are selected so as to promote light scattering, mixing, and uniform illumination of the sample regardless of the wavelength of light used. This can beneficially provide more uniform monochrome images that, when compiled into a color image (whether for use as a color video frame in a color video or as an independent color image), result in an accurate reproduction of the sample with a good color balance. It can additionally reduce the amount of post-production image processing involved in generating a uniform, color balanced color video.

As used herein, an image of a sample has a "good" color balance when the colors in the image appear to have the same general appearance as the colors in the original sample. More particularly, neutral colors (e.g., greys and white) in the sample appear neutral in the reproduced image when the image has a "good" color balance. Additionally, or alternatively, non-neutral colors within the reproduced image can appear to have the same color (e.g., the same hue, saturation, and/or brightness) as colors in the original sample when the image has a "good" color balance.

In some embodiments, the sample 109 is manipulated while the monochrome images are captured and the color video is generated. For example, the sample 109 can be manipulated with respect to its position by movement in one or more dimensions of stage assembly 108 on which sample 109 is positioned. Such manipulation of stage assembly 108 can include the movement of the stage assembly 108 (and correspondingly, sample 109) in one or more dimensions selected from the x, y and z dimensions. For example, stage assembly 108 can be moved in both the x and y dimensions as part of panning the field of view during the capture of the monochrome images and generation of the color video. These embodiments enable, for example, real-time or near-real-time color video while manipulating the sample such as panning the field of view in the x and y dimensions, adjusting the position of the sample in the z dimension, etc. In certain further embodiments, the real-time or near-real-time color video that is generated while the sample is manipulated is displayed on the user display device 112 while such manipulation occurs to enable a user to continue to view the generated and displayed video while continuing the manipulate the sample, which can, e.g., help guide the identification of one or more regions of interest to a user while they observe the displayed color video.

In some embodiments, the sample 109 is focused while the monochrome images are captured and the color video is generated. For example, the sample 109 can be manually focused by a user's adjustment of settings of imaging system 102, including settings of the microscope assembly 110 and/or the stage assembly 108 to adjust the focus of sample 109. Alternatively, sample 109 can be automatically focused, for example by autofocus software employed by computing device 106. These embodiments enable, for example, real-time or near-real-time color video while sample 109 is manually or automatically focused. In certain further embodiments, the real-time or near-real-time color video that is generated while the sample is focused is displayed on the user display device 112 while such focusing occurs, which can, e.g., help guide selection of the best focus for at least a region of interest that is being displayed.

In some embodiments, the generated video includes at least in part a z-stack video. Imaging system 102 can be configured to acquire a series of z-stack images, which can, e.g., show a region of interest while focusing at different levels (e.g., the middle of sample 109, the bottom of sample 109, the top of sample 109) or enable the generation of a composite image with a greater depth of field than the individually acquired images. In such embodiments, during the capture of such z-stack images, imaging system 102 can continue to provide color video. These embodiments enable, for example, real-time or near-real-time color video while z-stack images are obtained. In certain further embodiments, the real-time or near-real-time color video that is generated while the sample is focused is displayed on the user display device 112 while such focusing occurs, which can, e.g., help guide selection of z-stack settings (e.g., position settings, step size settings, depth of field setting, projection method settings, etc.).

In some embodiments, the monochrome images are captured and the color video is generated while one or more illumination conditions are adjusted. Imaging system 102 can allow for a variety of illumination conditions to be adjusted while still capturing the monochrome images and generating the color video. Non-limiting examples of illumination conditions that could be adjusted in such embodiments include adjusting one or more lighting condensers (e.g., lighting condenser 111), adjusting one or more light diffusers (e.g., light diffuser 120), adjusting a wavelength of the one or more light sources (e.g., by activating a different light source, by using a different excitation filter on a filter wheel, etc.), adjusting whether light is blocked from one or more of the one or more light sources 118, or adjusting whether light is revealed from one or more of the light sources 118. These embodiments enable, for example, real-time or near-real-time color video while one or more illumination conditions are adjusted. In certain further embodiments, the real-time or near-real-time color video that is generated while the one or more illumination conditions are adjusted is displayed on the user display device 112 while such adjustment occurs, which can, e.g., help guide the selection of the final illumination conditions for at least a region of interest that is being displayed.

Figure 3:
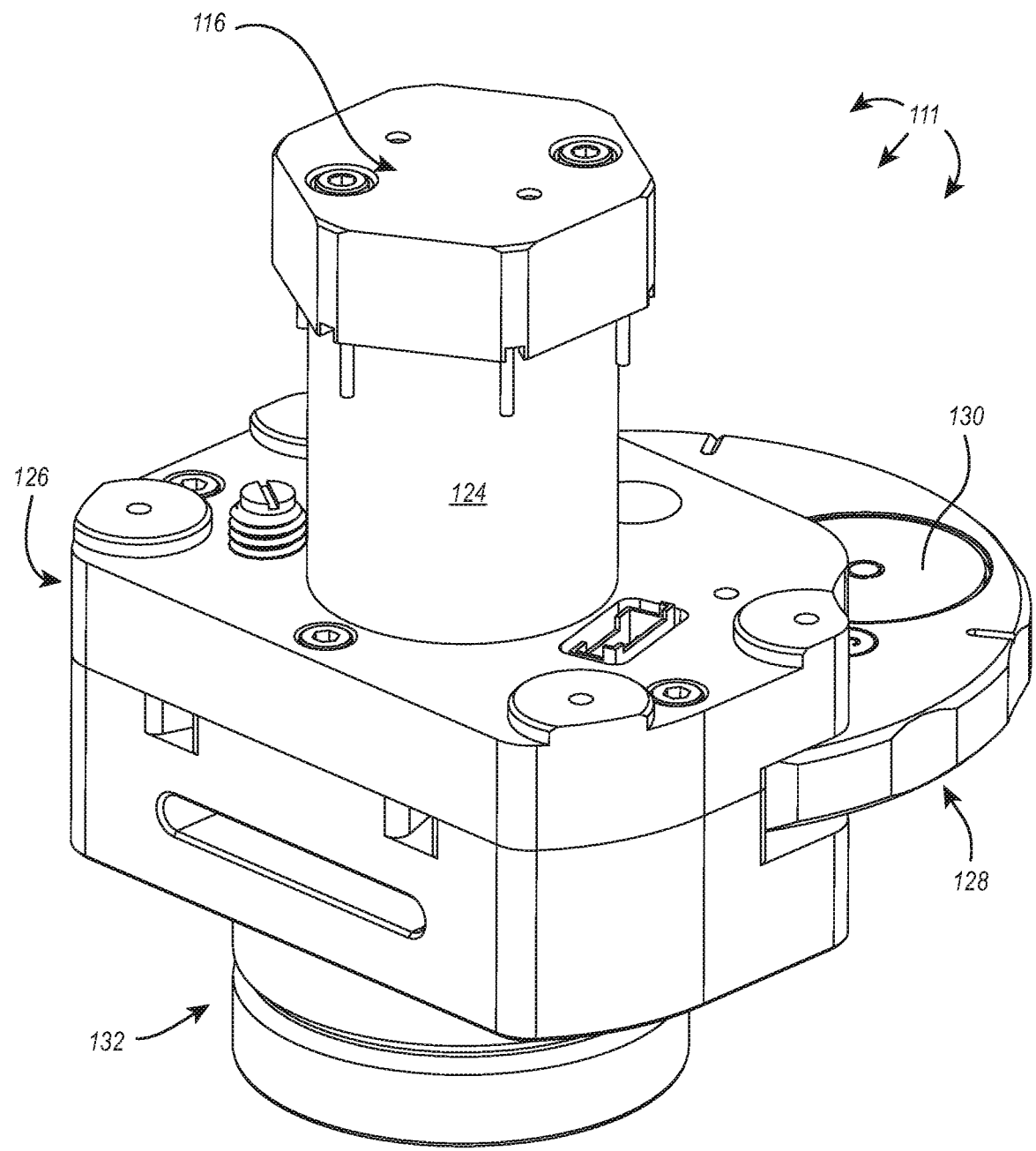
FIG. 3 illustrates an assembled perspective view of an exemplary lighting condenser configured to illuminate a sample in a sequence.
Figure 4:
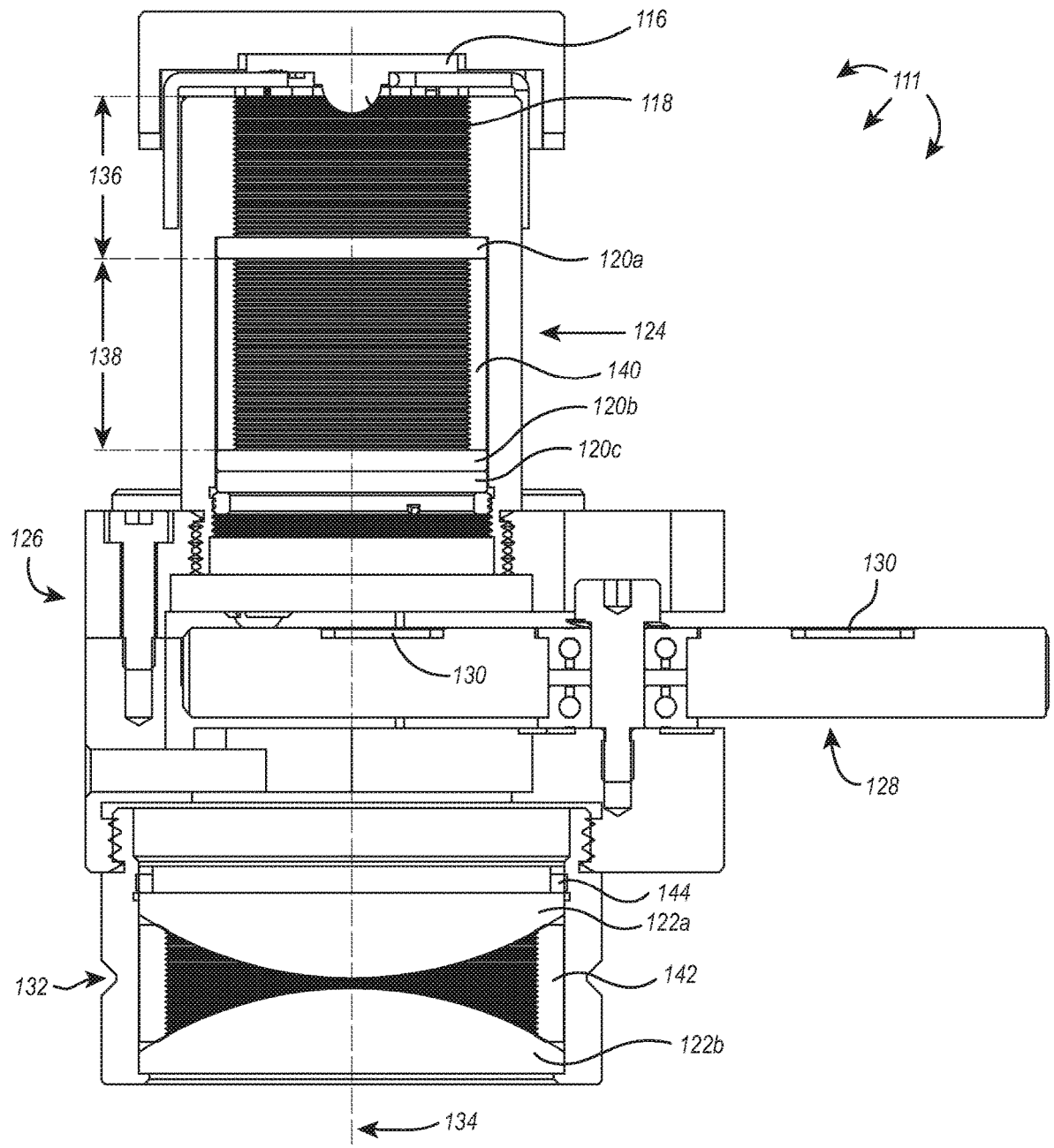
FIG. 4 illustrates a cross-sectional view of the lighting condenser of FIG. 3.

FIGS. 3 and 4 illustrate an exemplary embodiment of a lighting condenser 111 for use in systems and methods for generating a color image/video using a monochrome camera. FIG. 3 illustrates an assembled perspective view of the exemplary lighting condenser 111, and FIG. 4 illustrates a cross-sectional view of the lighting condenser 111 of FIG. 3.

In the exemplary embodiment of FIGS. 3 and 4, the lighting condenser 111 includes a light assembly 116 disposed at a proximal end of a light barrel 124. A distal end of the light barrel 124 is coupled (e.g., by threads, as shown, or by any other attachment mechanism known in the art) to a proximal end of the condenser body 126, which retains a phase wheel 128 therein and allows the phase wheel 128 to rotate any of a plurality of phase annuli 130 into position within the light path and/or about the optical axis to accommodate various microscopy methods. The phase wheel 128 and associated annuli 130 are configured for uses as known in the art and can be selected based on the desired microscopy method (e.g., the phase wheel can incorporate objective-specific phase annuli to enable phase contrast microscopy or no annulus to enable bright field microscopy). The lighting condenser 111 of FIGS. 3 and 4 additionally includes a lens tube 132 coupled (e.g., by threads, as shown, or by any other attachment mechanism known in the art) to a distal end of the condenser body 126. The lens tube 132 houses and retains a pair of condenser lenses 122*a*, 122*b*.

With respect to the light assembly 116 of lighting condenser 111, the light assembly 116 comprises a plurality of light sources 118 positioned about the optical axis 134 of the lighting condenser 111 and which are configured to be selectively energized to emit light within the light barrel 124. The emitted light passes through each of the three light diffusers 120*a*, 120*b*, and 120*c* disposed within the light barrel 124, and in doing so, the light intensity is homogenized over the light path and adequate color mixing occurs. As shown, the first light diffuser 120*a* is positioned a first distance 136 away from the light sources 118 and a second distance 138 away from the second light diffuser 120*b*. The first and second light diffusers 120*a*, 120*b* can be spaced apart using, for example, a spacer 140. The air gaps spanning the first and second distances 136, 138 can allow more chances for light scattering and mixing, which increases the overall illumination uniformity.

In one embodiment, the light barrel 124 can be assembled by first fixing a retaining ring at the distal end of the light barrel 124 followed by positioning the third light diffuser 120*c* adjacent the retaining ring and positioning the second light diffuser 120*b* adjacent the third light diffuser 120*c*. A spacer 140 can then be threadedly advanced within the light barrel 125 toward the distal end thereof until it abuts the second light diffuser 120*b* or otherwise secures the second light diffuser 120*b* within the light barrel 124. The first light diffuser 120*a* can subsequently be positioned adjacent the spacer 140 and on an opposite side of the spacer 140 than the second light diffuser 120*b*. In some embodiments the first light diffuser 120*a* is additionally fixed and/or retained within the light barrel 124 by a retaining ring (not shown) disposed on a proximal side of the first light diffuser 120*a* and opposite the spacer 140.

With continued reference to FIGS. 3 and 4, a non-limiting working example can include a light barrel 124 that is ~32 mm in diameter by ~53 mm in length with the first light diffuser 120*a* positioned ~14 mm from the light source 118, the second light diffuser 120*b* positioned ~19 mm from the first light diffuser 120*a*, and the third light diffuser 120*c* positioned adjacent to and touching the second light diffuser 120*b*. Additionally, the first and second light diffusers 120*a*, 120*b* can each comprise a 120 grit diffuser, and the third light diffuser 120*c* can comprise a 220 grit diffuser. In this (and other) embodiments, the light diffusers 120*a*, 120*b*, 120*c* are oriented so that the grit surface is facing away from the light source 118. This foregoing light barrel configuration, when assembled with a pair of condenser lenses 122*a*, 122*b* (e.g., spaced no more than 80 mm away from the third light diffuser 120*c*), can beneficially produce good color mixing, intensity uniformity, and minimal pixel shifts between light channels.

Many of these benefits can be maintained with other configurations. For example, one or more of good color mixing, intensity uniformity, or minimal pixel shifts between light channels can be maintained in a light barrel that measures between 20-50 mm in diameter, preferably between 30-40 mm in diameter, and more preferably between about 32-35 mm in diameter and that measures between any of 10-100 mm in length, 30-80 mm in length, or 45-55 mm in length. In one embodiment, the length of the light barrel is limited to those lengths where the light sources are not conjugate to the sample plane with respect to the position of the condenser lenses within the lighting condenser.

Additionally, or alternatively, the first and second distances 136, 138 spacing the first light diffuser 120*a* from the light sources 118 and from the second light diffuser 120*b*, respectively, may be different (i.e., greater or less) than as shown and provided in the non-limiting working example above. In some embodiments, it is possible that the first and/or second distances 136, 138 may be reduced without strongly impacting the performance of the lighting condenser.

Further, it should be appreciated that although the lighting condenser 111 is illustrated in FIGS. 3 and 4 as having three light diffusers 120*a*, 120*b*, 120*c*, in some embodiments, the lighting condenser includes greater or fewer light diffusers than those illustrated in FIGS. 3 and 4. Among other things, the number of light diffusers can affect color mixing, intensity uniformity, and the amount of drive current and optical power required per channel to replicate similar imaging conditions. In some embodiments, the presence of a third light diffuser significantly impacts the performance of the lighting condenser. For example, the presence of a third light diffuser can allow for good color mixing.

Accordingly, reducing the number of light diffusers may negatively impact color mixing and intensity uniformity but decrease the drive current and optical power per channel necessary to replicate the similar imaging conditions as the lighting condenser 111 of FIGS. 3 and 4. On the other hand, increasing the number of light diffusers may positively impact color mixing and intensity uniformity but increase the drive current and optical power per channel necessary to replicate similar imaging conditions. For example, a lighting condenser having a single light diffuser can use $\frac{1}{10}$-$\frac{1}{30}$ the drive current and optical power to replicate imaging conditions similar to the lighting condenser 111 of FIGS. 3 and 4.

After the light passes through the lighting condensers and annuli (if any) of the phase wheel, it is directed to a pair of condenser lenses 122a, 122b. Similar to the light diffusers 120a, 120b discussed above, the condenser lenses 122a, 122b are associated with a lens tube 132 and positioned a distance apart by a spacer 142. The condenser lenses 122a, 122b can additionally be retained in a defined position relative to one another by a retaining ring 144. In one embodiment, the lens tube 132 and condenser lenses 122a, 122b are positioned within the lighting condenser 111 such that the light path is focused on the stage assembly, and more particularly on the sample associated therewith.

Exemplary Light Assemblies

Light assemblies, such as light assembly 116 described above and depicted in more detail in FIG. 5, are used in the disclosed systems and methods for generating a color image/video. The light assembly 116 is configured to selectively energize each of a plurality of light sources in a sequence. The sequence can be, for example, a cyclic sequence of the primary light colors RGB with each light source comprising a different color. In the exemplary embodiment shown in FIG. 5, the plurality of light sources can comprise a multiple emitter LED package 148 with each color being a separate emitter/semiconductor die packaged together as an LED source. For example, the LED package 148 can include a red LED source 118a, a green LED source 118b, a blue LED source 118c, and a while LED source 118d positioned in quadrants about the center of the LED package. As a non-limiting example, the red LED source 118a is a 617 nm light, the green LED source 118b is a 530 nm light, and the blue LED source 118c is a 447.5 nm light.

Figure 5:
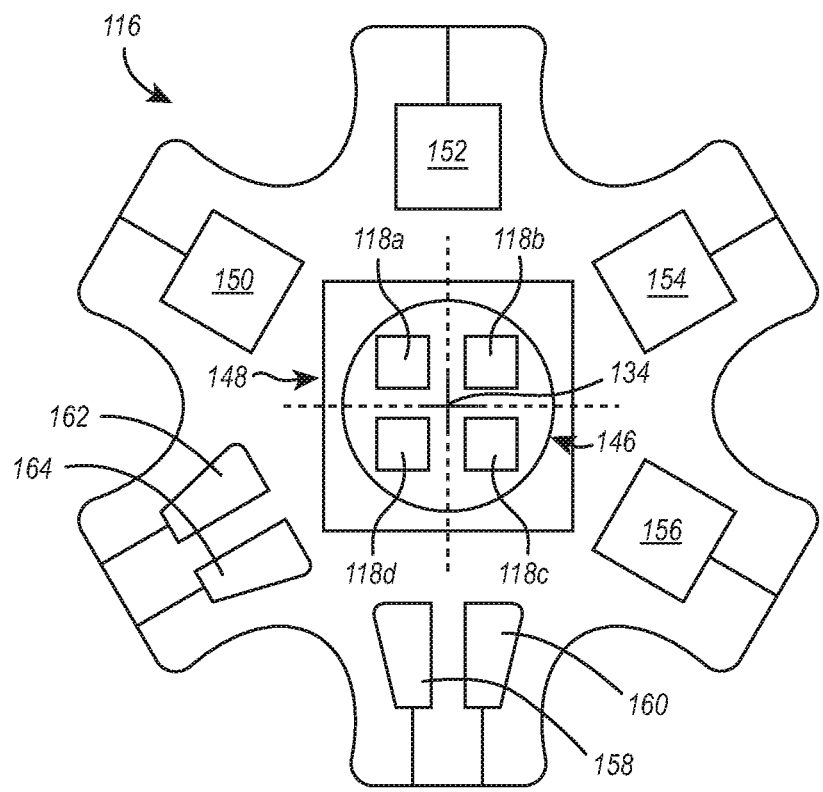
FIG. 5 is a schematic of one embodiment of a light assembly configured for use with lighting condensers disclosed herein and illustrates an exemplary configuration of electrical connections and light sources.

In one embodiment, the center of the LED package 148 corresponds to the optical axis 134 of the lighting condenser 111. As can be seen in FIG. 5, the LED package 148 can arrange the light sources in a generally circular pattern about the optical axis 134. In some embodiments, the LED package can include an additional light source positioned generally at the center of the generally circular pattern (not shown). For example, the additional light source can be positioned so that it is aligned along the optical axis 134 of the lighting condenser 111. During operation, each of the RGB LED sources is selectively energized, causing the sample to be illuminated in a red, green, or blue light. Because the RGB LEI) sources are not emitting light from the same position, there is a possibility that the resulting monochrome images will include pixel shifts between each of the RGB light channels. By positioning the RGB LED sources about the optical axis, the prevalence of pixel shifts is reduced. The intensity uniformity and color mixing enabled by passing the light emitted from the RGB LED sources through light diffusers (e.g., light diffusers 120a, 120b, and 120c of FIG. 4) can additionally prevent or reduce artifacts that may arise from illuminating the sample from different angles.

In some embodiments, the plurality of light sources can additionally include a fluorophore excitation source configured to produce excitation light directed to the fluorophores within the sample being imaged and induce a fluorophore emission light therefrom. Such embodiments can enable fluorescence imaging of samples in addition to or separate from the color and monochrome imaging enabled by the disclosed systems. In some embodiments, the fluorescent images are incorporated into video frames to create a monochrome fluorescence imaging video or as an additional component within a color video. For example, a color video can be produced using RGB images, generating a background color image, and fluorescence peaks can be overlain on the image indicating the location and/or action of fluorescence objects within the images comprising the color video. Accordingly, the systems described herein can additionally include fluorescence imaging capabilities, whether incorporated as part of a color or monochrome video or as standalone monochrome fluorescence images/video.

In some embodiments, and as illustrated in FIG. 5, a lens 146 can be disposed over the plurality of light sources 118a, 118b, 118c, 118d, which can act at the emitter origin to at least partially centralize and distribute the light path along the optical axis 134—thereby also acting to reduce artifacts that may arise from illuminating the sample from different angles.

With continued reference to FIG. 5, the light assembly 116 includes a plurality of connection points 150, 152, 154, 156, 158, 160, 162, 164, as known in the art, for electrically coupling each LED source to a connector (not shown). Each LED source is associated with a pair of connection points (one corresponding to the positive terminal and one corresponding to the negative terminal). For example, the red LED source 118a can be associated with two adjacent connection points 150, 152, whereas the white LED source can be associated with two other connection points 162, 164. The location and positioning of connection points illustrated in FIG. 5 can beneficially allow for better wire management, biasing wires away from grooved regions of the light assembly body, but the location and positioning can vary, as known in the art.

Importantly, in some embodiments, the LED sources of the light assembly 116 form part of an electrical switch. For example, wires terminating at the connection points can be coupled (e.g., directly or via a connector) at an opposite end to a controller configured to selectively energize the LED sources in a sequence. This enables the LED sources to be individually and rapidly energized in a controlled manner, and in some embodiments, the controller selectively energizing the LED sources is also controlling or instructing a monochrome camera to capture image data in synchrony with sample illumination by the selectively energized LED sources.

Figure 6:
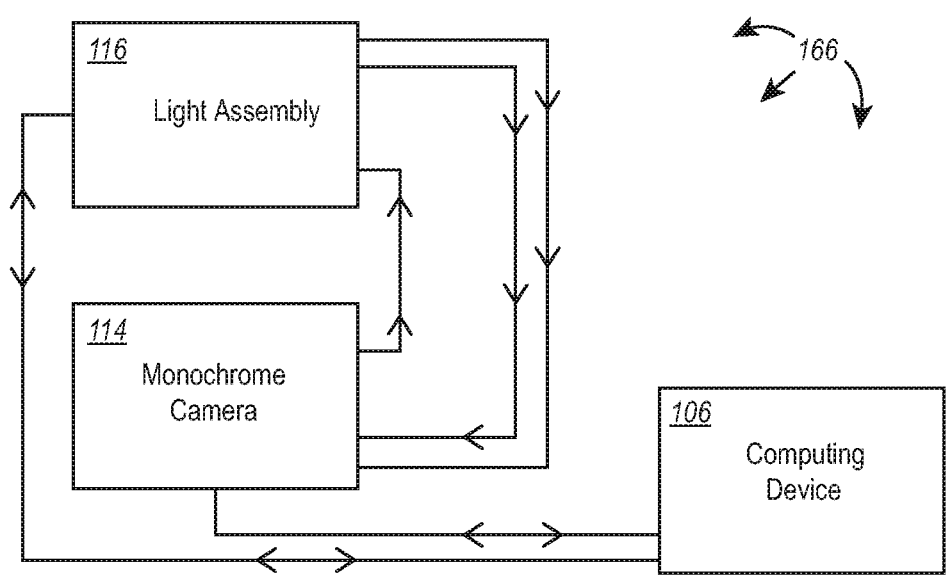
FIG. 6 illustrates an exemplary wiring/communication diagram for coordinating sequential lighting and capture of monochrome images for generating a color video.

An exemplary wiring/communication diagram 166 illustrating the foregoing is depicted in FIG. 6. The diagram 166 shows the wiring between the light assembly 116 (e.g., via an associated LED electronics board), a monochrome camera 114 and a computing device 106. The diagram 166 depicts three wires connected between the light assembly 116 and camera 114. These wires can utilize, for example, the camera's General Purpose Input Output (GPIO) connections. Line 1 represents an output from the camera 114 indicating a high level during frame exposure. A signal transition from high to low occurs as each frame exposure is completed, signaling the light assembly 116 to transition to the next color LED source in a predefined sequence (e.g., a triplet cyclic sequence comprising one or a combination of RGB, RBG, GRB, GBR, BGR, or BRG). The sequence can proceed, for example, from red to green to blue and repeats as the camera continuously and/or synchronously captures images and signals the light assembly 116 through Line 1.

In the exemplary wiring/communications diagram 166, Lines 2 and 3 represent outputs from the light assembly 116 that indicate the current LED source being energized or simply the color of light being used for illumination. In one embodiment, these values can transition between the binary values of 1 (01), 2 (10), and 3 (11) to indicate Red, Green, and Blue, respectively, during color video display. During monochrome video and image capture Lines 2 and 3 can be binary 0 (00). Color information and optionally a timestamp or other time-related information associated with the LED source being energized when the image was captured can be associated with the acquired image within the camera 114, and this information is transmitted with the image data itself from the camera 114 (e.g., via a USB connection) to the computing device 106. Alternatively, a timestamp can be associated with each acquired image based upon when it was received by the computing device 106. A color can be associated with each image based upon when it is received, or alternatively, a color can be determined for each received image based on a back-calculation of what light source was illuminated at the time the image was captured—based on the light source illumination sequence. Computer-executable instructions such as software that are stored on the computing device 106 accesses the color information to determine the illumination conditions of the particular monochrome image received.

Alternatively, the computing device 106 can query the monochrome camera 114 to determine the current GPIO line values (and thereby determine the image color) or communicate with the light assembly 116 to determine the current LED source illumination color. However, these methods are prone to timing errors, which could cause a misidentification of the illumination color of the current image being retrieved from the camera 114. For at least this reason, the former method of embedding the LED color illumination information within the image data itself may be preferred.

As provided above, a light assembly (e.g., light assembly 116 of FIG. 5) can include a plurality of light sources positioned around the optical axis of a lighting condenser and configured to be selectively energized to emit light within the light barrel. In some embodiments, selectively energizing the light sources includes selectively blocking and revealing light originating from each of the plurality of light sources. For example, the light assembly can additionally include a disc proximate the plurality of light sources and configured to selectively block and reveal light originating from each of the plurality of light sources.

In one embodiment, the disc defines an aperture positioned relative to the light sources such that it reveals a single light source while blocking the remaining light sources. Rotating the disc about the optical axis can reveal other light sources and block the previously revealed light source. In such an exemplary embodiment, the plurality of light sources can remain in an energized state as oppose to cycling on and off, and the rotation of the aperture can act to allow individual light sources to shine on the sample. Furthermore, the rotating disc can be controlled by a computing device (e.g., similar to computing device 106 described above) to coordinate revealing each of the plurality of light sources with capturing images at the monochrome camera when each of the plurality of light sources illuminates the sample.

Generating a Color Video from Monochrome Images

During operation of an imaging system configured to generate color images/video (or after acquiring and storing requisite image data), monochrome images are received together with LED source illumination information (as above). Color images are created by the computing device 106 by compiling red, green, and blue pixel data from each of the red, green, and blue monochrome images. Each pixel in a resulting color image includes the pixel data from the same pixel location within the red, green, and blue monochrome images. Adjustments may be made to the intensity of the individual red, green and blue values (or the red, green, and blue monochrome images generally) to create a color image with a good color balance. Additional post processing can be implemented to correct a pixel shift within the monochrome images, thereby ensuring the pixel data within the red, green, and blue monochrome images are compiled in such a way that a given pixel area of the sample is accurately represented in the color image resulting from the compiling process.

In one embodiment, each LED source is energized at the same intensity and for the same period of time, and the monochrome camera is configured to synchronously capture monochrome images using the same exposure time for each color. However, each of the intensity of the LED source, the time period for which the LED source is energized, and the exposure time of the monochrome camera can be adjusted to a desired result. This can be accomplished, for example, by energizing each light source for a defined and potentially different amount of time, or in the case of a rotating disc with an aperture that selectively reveals a light source, rotating the aperture coincident with each light source according to a desired exposure time for each light source. In one instance, the desired result is a color image with good color balance. When combining sequential color images into a color video, it can be advantageous to maximize the monochrome image capture rate, which will reduce a potential lag between video frames. Accordingly, it may be beneficial in some instances to minimize the exposure time for each color. Individual adjustments to the intensity of the LED sources (e.g., differentially and specifically increasing the intensity of the red, green, and blue LED sources) can allow the resulting color images to retain a good color balance.

Figure 7A:
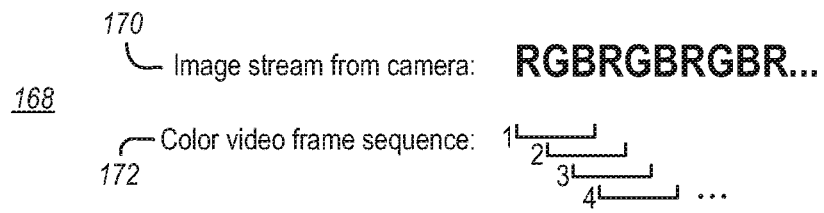
FIG. 7A is a diagram that illustrates one embodiment for selecting images from a stream of monochrome images captured at a monochrome camera to form a sequence of color video frames that comprise a color video.

FIG. 7A illustrates one paradigm 168 for generating a sequence of color video frames 172 from an image stream 170 of red, green, and blue monochrome images. Each monochrome image within the image stream 170 is represented as a letter corresponding to the LED source color used during image acquisition (i.e., "R" for red, "G" for green, and "B" for blue). As illustrated by the image stream 170, the LED sources were selectively energized in a cyclic RGB sequence, resulting in an image stream of "RGBRGBRGBR . . . ". It should be appreciated that other sequences can be used, as described above, or one of the colors can be represented at a different frequency (e.g., RGBRGRGB . . . , RGBGBRGB . . . , RGBRBRGB . . . , RGRBRGRB . . . , RGBGRGBG . . . , RBGBRBGB . . . , or similar).

As shown in FIG. 7A, a first color video frame within the sequence of color video frames 172 comprises a compilation of the first instances of each component color R, G, and B. The second color video frame is "GBR," a compilation of the green and blue monochrome images from the first color video frame with a more recent red monochrome image. The third color video frame is "BRG," a compilation of the blue monochrome image from the first color video frame, the red monochrome image from the second video frame, and a more recent green monochrome image. This paradigm 168 can be generalized as a compilation of the three most recent component images (e.g., as determined by timestamps associated with each image). As each subsequent monochrome image is received, it is compiled with the two most recent component monochrome images not corresponding to the color of the received monochrome image. As a generic example extrapolated from FIG. 7A, a first video frame can be compiled from a first monochrome image corresponding to the first stage of the light sequence, a second monochrome image corresponding to the second stage of the light sequence, and a third monochrome image corresponding to the third stage of the light sequence. A fourth monochrome image corresponding to a repeated first stage of the light sequence can be compiled with the second and third images to generate a second video frame. Likewise, a fifth monochrome image corresponding to a repeated second stage of the light sequence can be compiled with the third and fourth monochrome images to generate a third video frame, and a sixth monochrome image corresponding to a repeated third stage of the light sequence can be compiled with the fourth and fifth monochrome images to generate a fourth video frame.

In some embodiments, the color images received in the image stream 170 can be ordered based upon timestamps associated with each image (i.e., chronologically), in the order received by the monochrome camera, or by identifying a color associated with each received image and placing the image within the next available position for that given color with a defined sequence (e.g., RGBRGBRGB . . . ). The latter can prevent the inadvertent placement of color images within the predefined sequence of component colors based on timing errors or overlapping receipt of multiple images.

The paradigm 168 of FIG. 7A can provide a high fidelity, responsive color video with minimal lag. Once the first color video frame is generated, the frame rate for the color video is equivalent to the monochrome image capture rate. However, this paradigm 168 can be more computationally expensive than other color video generation paradigms.

Figure 7B:
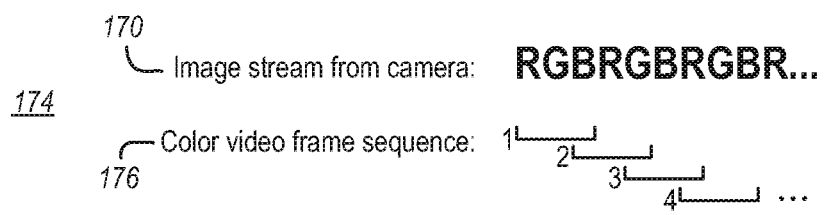
FIG. 7B is a diagram that illustrates another embodiment for selecting images from a stream of monochrome images captured at a monochrome camera, to form a sequence of color video frames that comprise a color video.

FIG. 7B illustrates another paradigm 174 for generating a sequence of color video frames 176 from an image stream 170 of red, green, and blue monochrome images. As shown, a first color video frame within the sequence of color video frames 176 comprises a compilation of the first instances of each component color R, G, and B. The second color video frame is "BRG," a compilation of the blue monochrome image from the first color video frame with more recent red and green monochrome images. The third color video frame is "GBR," a compilation of the green monochrome image from the second color video frame with more recent blue and red monochrome images. This paradigm 174 can be generalized as a compilation of composite color images that share at least two monochrome images with at least one other composite color image, or more specifically as a compilation of the oldest component color image with the two most recent component images.

In a general sense, the paradigm 174 allows for color video frame sequences to be compiled using composite images that share monochrome image data. For example, a first and second video frame can include composite images that share the same two monochrome images but differ with respect to the remaining monochrome image. As a more detailed example, a first and second video frame (which are not necessarily chronologically sequential) can include composite images that share the same blue and green monochrome images but which are each made using a different red monochrome image.

The paradigm 174 of FIG. 7B can provide a less responsive color video having slightly more lag than the color videos generated under the paradigm 168 of FIG. 7A. Once the first color video frame is generated, the frame rate for the color video is equivalent to twice the monochrome image capture rate. However, this paradigm 174 can be computationally less expensive than the paradigm 168 of FIG. 7A.

Figure 7C:
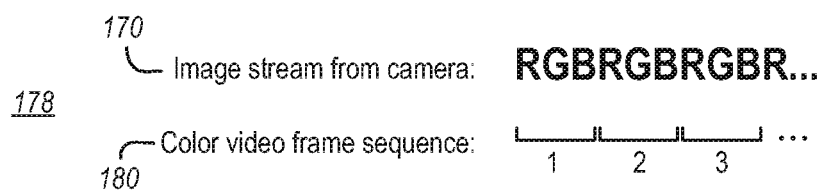
FIG. 7C is a diagram that illustrates yet another embodiment for selecting images from a stream of monochrome images captured at a monochrome camera to form a sequence of color video frames that comprise a color video.

FIG. 7C illustrates another paradigm 178 for generating a sequence of color video frames 180 from an image stream 170 of red, green, and blue monochrome images. As shown, a first color video frame within the sequence of color video frames 176 comprises a compilation of the first instances of each component color R, G, and B. Each subsequent color video frame is similarly "RGB," a compilation of the most recent red, green, and blue monochrome images without using any monochrome image represented within a previous color video frame. This paradigm 174 can be generalized as a compilation of unique triplet RGB images.

The paradigm 174 of FIG. 7C provides a less responsive color video with more lag than the color videos generated under the previous paradigms 168, 174 of FIGS. 7A and 7B. The frame rate for the color video is equivalent to three times the monochrome image capture rate.

Color cameras include a Bayer filter to ensure each pixel receives only single □ color intensity information at given pixel locations. To create a color image, information on all three colors is required for each pixel location so a demosaicing process is used to interpolate the missing color information at each pixel. This process results in image artifacts where abrupt changes in color occur or along sharp edges present in the sample.

Images resulting from the color image generation outlined in FIGS. 7A-7C do not suffer from these artifacts, resulting in better image quality for video and captured images for samples not in motion. For samples which are in motion some color banding artifacts may occur during sample movement caused by individual image color component information being more recent in time and therefore in a new position with respect to the other two component colors in the image. These artifacts cannot likely be corrected by changing the number of new images included in the generation of the color image since each component image is always acquired at a slightly different time.

In some embodiments, the color banding artifact can be mitigated by maintaining high camera frame rates, which will keep time differences between frames small (and thus movement differences small). In some embodiments, color banding can be eliminated by keeping the sample still, or it can mitigated using image processing techniques. In one such image processing technique, the underlying offset of each frame in the video can be determined and a compensating offset applied for each color image component when composing the color video frames. This can include, for example, determining the vertical and/or horizontal offset of each video frame in the color video and compensating for the vertical and/or horizontal offset by adjusting the vertical and/or horizontal pixel locations—in whole or in part—within each monochrome image comprising the affected video frames. Compensations such as the these can be beneficial in reducing or ameliorating lag, particularly within embodiments having a slower video frame rate (e.g., as shown and discussed in FIG. 7C).

Some colors in resulting color image frames may not be as clearly distinguishable compared to using a color camera.

For example, red versus orange and blue versus violet tend to be less distinguishable compared to an image generated from a color camera using a Bayer filter. To help differentiate colors which appear similar under the RGB LED illumination, additional LED colors could also be used to complement the RGB color information.

The systems and methods disclosed herein beneficially enable the dynamic generation of monochrome videos. For example, in response to a user request, color video generation (and display) can be switched to monochrome video generation (and display) by energizing a single LED source and capturing images at the monochrome camera equivalent to the exposure rate associated with that color. Monochrome video frames are compiled using each subsequently received monochrome image. A color video can be resumed on demand. Upon receiving a request for color video, the light assembly resumes selectively energizing the light sources in a sequence. The first color video frame can include as one component the last monochrome image taken within the monochrome video and compile the color video frames according to the paradigms discussed above or variations thereof.

It is to be understood that features described with regard to the various embodiments herein may be mixed and matched in any desired combination. In addition, the concepts disclosed or envisioned herein may be embodied in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A system for generating color videos with a monochrome camera, comprising:
   one or more processors; and
   one or more computer readable media having stored thereon computer-executable instructions that are executable by the one or more processors to cause the system to generate a color video from compiled monochrome images captured at a monochrome camera by causing the system to at least:
   selectively energize each of a plurality of light sources in a sequence, the sequence having a series of stages with each stage of the sequence corresponding to activation of a different wavelength of light from one or more light sources to illuminate a sample;
   capture a monochrome image of the illuminated sample at the monochrome camera at each stage of the sequence to thereby generate a plurality of monochrome images each associated with one of the different wavelengths of light; and
   compile the plurality of monochrome images into a series of color video frames to thereby generate the color video,
   wherein the color video frames of the color video are not false-colored images, and
   wherein the color video frames of the color video are compiled from the monochrome images by combining pixel intensity values for each of the different wavelengths of light.

2. The system of claim 1, wherein selectively energizing each of the plurality of light sources in the sequence comprises energizing each of the plurality of light sources for a predefined period of time and with a predefined intensity.

3. The system of claim 1, further comprising color balancing the color video, wherein color balancing the color video comprises automatically adjusting a predefined intensity or a predefined period of time of selectively energizing one or more of the plurality of light sources in the sequence.

4. The system of claim 1, wherein selectively energizing each of the plurality of light sources comprises selectively blocking and revealing light originating from each of the plurality of light sources such that the light is revealed in the sequence.

5. The system of claim 1, wherein generating the color video comprises compiling a sequence of video frames such that each video frame comprises a composite color image of:
   a first monochrome image captured at a first stage of the sequence, the first stage associated with a first wavelength of light;
   a second monochrome image captured at a second stage of the sequence, the second stage associated with a second wavelength of light; and
   a third monochrome image captured at a third stage of the sequence, the third stage associated with a third wavelength of light.

6. The system of claim 5, wherein compiling the sequence of video frames comprises generating a most recent video frame within the sequence of video frames, the most recent video frame comprising first, second, and third monochrome images having a most recent timestamp.

7. The system of claim 5, wherein compiling the sequence of video frames comprises:
   compiling a first video frame, wherein the composite color image of the first video frame comprises the first monochrome image, the second monochrome image, and the third monochrome image; and
   compiling a second video frame chronologically after the first video frame, wherein the composite color image of the second video frame comprises the second monochrome image, the third monochrome image, and a fourth monochrome image,
   wherein the fourth monochrome image is associated with the first wavelength of light selectively energized in a subsequent cycle of the sequence.

8. The system of claim 5, wherein the color video has a frame rate between at least 6-24 frames per second and is generated as a near-real-time color video.

9. The system of claim 5, wherein capturing a monochrome image comprises capturing monochrome z-stack images of the illuminated sample at the monochrome camera at each stage of the sequence, and wherein generating the color video comprises generating a z-stack video of the captured monochrome z-stack images.

10. The system of claim 1, further comprising generating a monochrome video by causing the system to continuously energize a single light source to illuminate the sample and compiling a plurality of monochrome images captured at the monochrome camera into a series of monochrome video frames.

11. The system of claim 10, wherein generating the monochrome video further causes the system to selectively receive monochrome images associated with a single stage of the sequence, the single stage of the sequence corresponding to selectively energizing the single light source within the sequence.

12. The system of claim 1, wherein the color video is generated as a near-real-time color video or has a time lag less than about 2 seconds.

13. The system of claim 1, wherein the instructions, when executed, further cause the system to focus a biological sample while continuing to generate the color video.

14. The system of claim 13, further comprising a user display device, and wherein the instructions, when executed, further cause the system to display the color video on the user display device while focusing the biological sample.

15. The system of claim 1, further comprising:
a light assembly comprising the plurality of light sources arranged about an optical axis of the light assembly, wherein the light assembly selectively energizes each of the plurality of light sources in the sequence; and
a stage assembly configured to receive the sample within a light path of the light assembly, the monochrome camera being disposed within the light path,
wherein the one or more processors comprises an image processor in electrical communication with the monochrome camera, the image processor configured to receive the plurality of monochrome images at successive time points and compile the plurality of monochrome images into the series of color video frames comprising the color video.

16. The system of claim 15, wherein the plurality of light sources comprises a plurality of light sets, each light set having a pair of light sources, the light sources of each light set being positioned on opposite sides of the optical axis, and wherein the plurality of light sources, when combined, generates a white light.

17. The system of claim 15, further comprising:
a microscope objective aligned with the optical axis;
a lens tube aligned with the optical axis; and
a light barrel aligned with the optical axis and positioned so as to encircle the light assembly, the light barrel having a light diffuser positioned therein.

18. The system of claim 17, further comprising a fluorophore excitation source configured to produce excitation light (i) directed to the stage assembly to induce fluorophore emission light from the biological sample positioned at the stage assembly and (ii) as a discrete stage in the sequence of the light assembly.

19. The system of claim 1, wherein the light barrel additionally comprises a second light diffuser spaced apart from the light diffuser by a distance between about 10-30 mm.

* * * * *